(12) United States Patent
Horng et al.

(10) Patent No.: US 6,483,209 B1
(45) Date of Patent: Nov. 19, 2002

(54) BALANCE RINGS FOR MOTORS

(75) Inventors: Alex Horng, Kaohsiung (TW); Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 12 days.

(21) Appl. No.: 09/880,800

(22) Filed: Jun. 15, 2001

(51) Int. Cl.[7] .............................. H02K 7/04; H02K 7/09
(52) U.S. Cl. ............................................. 310/51; 310/89
(58) Field of Search ....................... 310/257, 51, 67 R, 310/89; 360/99.08, 99.04, 98.07; H02K 7/09, 7/04, 3/24, 11/00

(56) References Cited

U.S. PATENT DOCUMENTS

| | | | | |
|---|---|---|---|---|
| 4,259,603 A | * | 3/1981 | Uchiyama et al. | 310/67 R |
| 5,258,672 A | * | 11/1993 | Wrobel | 310/42 |
| 5,391,952 A | * | 2/1995 | Simazu et al. | 310/51 |
| 5,699,854 A | * | 12/1997 | Hong | 310/51 |
| 6,050,785 A | | 4/2000 | Horng | 417/354 |
| 6,065,368 A | * | 5/2000 | Sohn | 310/51 |
| 6,414,411 B1 | * | 5/2000 | Horng | 310/67 R |
| 6,097,120 A | | 8/2000 | Horng | 310/90.5 |

* cited by examiner

Primary Examiner—Nestor Ramirez
Assistant Examiner—Karen Addison
(74) Attorney, Agent, or Firm—Bacon & Thomas, PLLC

(57) ABSTRACT

A motor comprises a base plate with an axle seat to which a stator bobbin is mounted. The stator bobbin comprises an axle hole for rotatably receiving a shaft of a rotor. The rotor comprises a permanent ring magnet. A balance ring is mounted to the base plate and comprises an upright annular wall and an annular bottom wall. The upright annular wall of the balance ring and a lower section of the permanent ring magnet attract each other while the annular bottom wall of the balance ring and a lower end face of the permanent ring magnet attract each other.

15 Claims, 5 Drawing Sheets

BALANCE RINGS FOR MOTORS

BACKGROUND OF THE INVENTION

1. Field of the Invention

The present invention relates to balance rings for motors, wherein a motor is equipped with a balance ring to provide a downward balancing and positioning force to a rotor of the motor during rotation of the rotor.

2. Description of the Related Art

U.S. Pat. No. 6,050,785 to Horng issued on Apr. 18, 2000 discloses a miniature heat dissipating fan assembly including a casing, a circuit board, a balance plate, a stator, a rotor, and a cover plate. The balance plate is made of magnetic material and mounted around a tube seat on the casing and below the rotor. A permanent ring magnet on the rotor and the balance plate attract each other to generate an attraction therebetween for creating a balancing force for assuring stable rotational movements of the rotor relative to the stator, thereby eliminating noise resulting from vibrations during rotation of the rotor. U.S. Pat. No. 6,097,120 to Horng issued on Aug. 1, 2000 discloses a brushless D.C. motor assembly including a balancing sheet made of material with magnetic conductivity, the balancing sheet having an axle hole joined together with a stator by an axle tube, a rotor rotatably received in the axle tube, the rotation thereof controlled by a controlling device, and the rotor having an annular permanent ring magnet with a diameter substantially the same as that of the balancing sheet wherein the permanent ring magnet and the balancing sheet attract with each other. It was, however, found that the balancing and positioning effect for the rotor was still unsatisfactory.

SUMMARY OF THE INVENTION

It is the primary object of the present invention to provide a motor with a balance ring that may provide a relatively large magnetic attraction area between the balance ring and a rotor of the motor, thereby providing the best positioning and balancing effect for the rotor during rotation of the rotor.

A motor in accordance with the present invention comprises a base plate with an axle seat to which a stator bobbin is mounted. The stator bobbin comprises an axle hole for rotatably receiving a shaft of a rotor. The rotor comprises a permanent ring magnet. A balance ring is mounted to the base plate and comprises an upright annular wall and an annular bottom wall. The upright annular wall of the balance ring and a lower section of the permanent ring magnet attract each other while the annular bottom wall of the balance ring and a lower end face of the permanent ring magnet attract each other.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
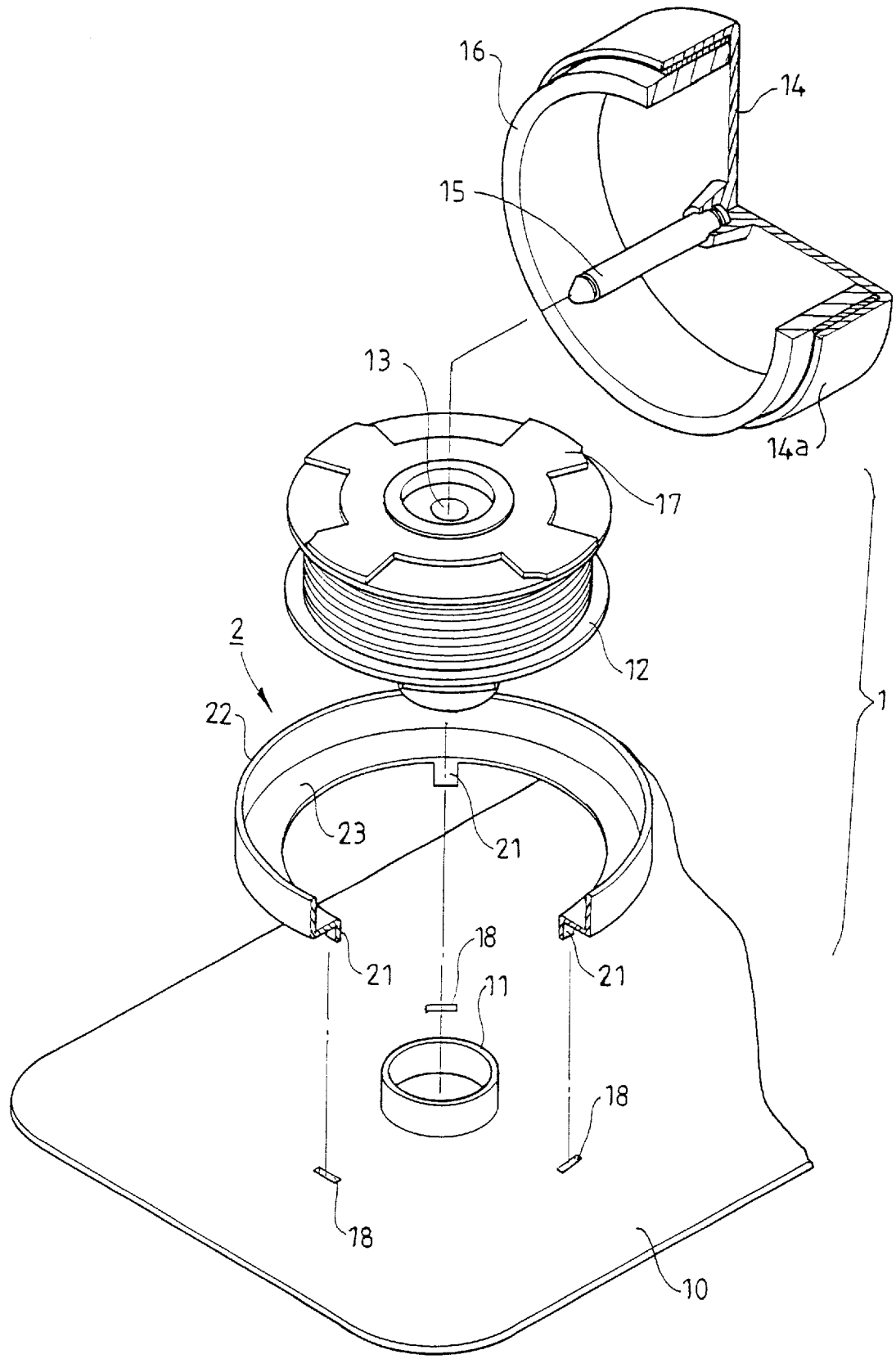
FIG. 1 is an exploded perspective view of a first embodiment of a motor rotor with a balance ring in accordance with the present invention.
Figure 2:
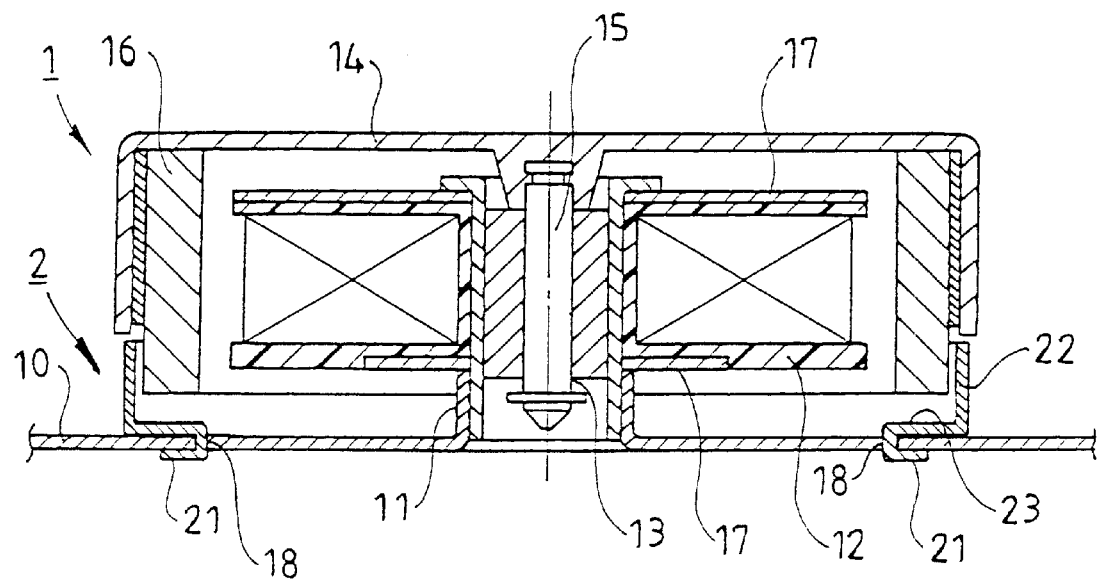
FIG. 2 is a sectional view of the motor rotor in FIG. 1.

Referring to FIGS. 1 and 2, a motor 1 in accordance with the present invention generally comprises a base plate 10 with an axle seat 11 formed thereon, a stator bobbin 12 mounted to the axle seat 11, and a rotor 14 having a shaft 15. Electric elements (not shown) for driving the motor are mounted on the base plate 10. The stator bobbin 12 includes an axle hole 13 for rotatably receiving the shaft 15 of the rotor 14. The rotor 14 further includes a skirt 14a, and a permanent ring magnet 16 is securely attached to an inner periphery of the skirt 14a. In this embodiment, the permanent ring magnet 16 extends beyond a lower edge of the skirt 14a of the rotor 14, best shown in FIG. 2.

The balance ring 2 is made of a material allowing mutual attraction between the balance plate 2 and the permanent ring magnet 16. The balance ring 2 is securely mounted to the base plate 10. In this embodiment, the base plate 10 includes a plurality of positioning holes 18 and the balance ring 2 includes a plurality of engaging pieces 21. Each engaging piece 21 is extended through an associated positioning hole 18 and then bent to provide the required fixing effect, best shown in FIG. 2. The balance ring 2 includes an upright annular wall 22. In this embodiment, the balance ring 2 further includes an annular bottom wall 23 extending radially inward from a lower annular edge of the upright annular wall 22. Preferably, the upright annular wall 22 is orthogonal to the annular bottom wall 23.

Referring to FIG. 2, in assembly, the shaft 15 of the rotor 14 is rotatably received in the axle hole 13 of the stator bobbin 12 with the upright annular wall 22 of the balance ring 2 located outside the permanent ring magnet 16 and with the annular bottom wall 23 of the balance ring 2 facing a lower end face of the permanent ring magnet 16. Thus, when the shaft 15 of the rotor 14 rotates, the upright annular wall 22 and the permanent ring magnet 16 attract each other while the annular bottom wall 23 and the permanent ring magnet 16 attract each other. Thus, the balance ring 2 and the permanent ring magnet 16 have a larger magnetic attraction area therebetween. As a result, since the upright annular wall 22 of the balance ring 2 faces a lower section of the permanent ring magnet 16 of the rotor 14 and since the permanent ring magnet 16 is attracted in two directions by the upright annular wall 22 and the annular bottom wall 23, respectively, the rotor 14 rotates about a fixed axis and is pulled downward in a balanced manner, thereby providing the rotor with the best balanced stable rotation.

Figure 3:
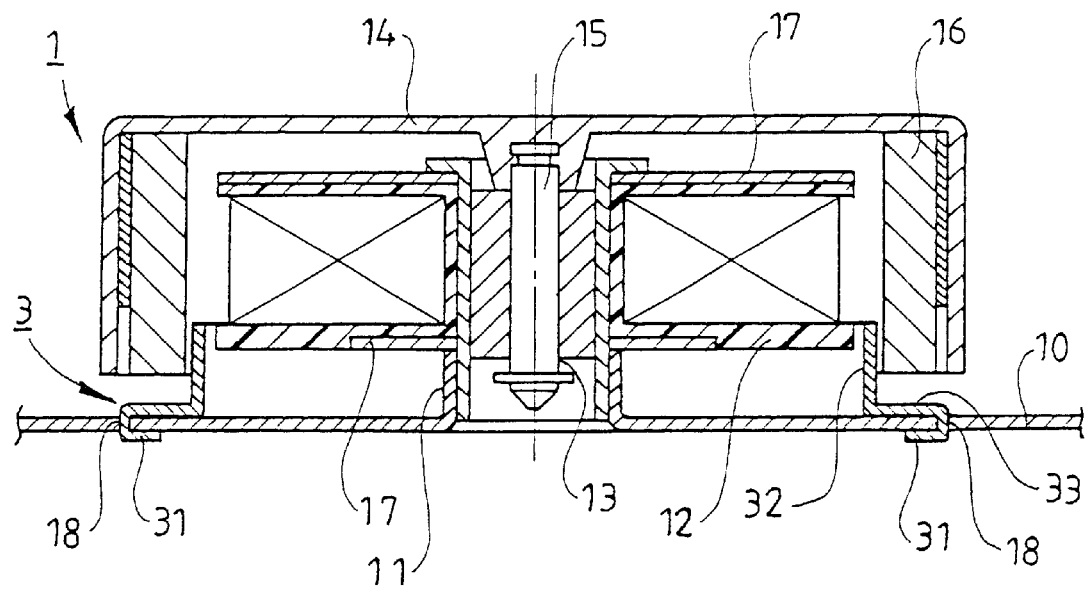
FIG. 3 is a sectional view similar to FIG. 2, illustrating a second embodiment of the motor rotor in accordance with the present invention.

FIG. 3 illustrates a second embodiment of the present invention, wherein the balance ring 3 comprises a plurality of engaging pieces 31 respectively engaged in the positioning holes 18 of the base plate 10. The balance ring 3 includes an upright annular wall 32 located inside the permanent ring magnet 16 and an annular bottom wall 33 extending radially outward from a lower annular edge of the upright annular wall 32. Preferably, the upright annular wall 32 is orthogonal to the annular bottom wall 33.

When the rotor 14 rotates, since the upright annular wall 32 is located inside the permanent ring magnet 16 and since the upright annular wall 32 and the permanent ring magnet 16 attract each other while the annular bottom wall 33 and the permanent ring magnet 16 attract each other, a relatively larger magnetic attraction area is provided between the balance ring 3 and the permanent ring magnet 16. Meanwhile, since the permanent ring magnet 16 is attracted in two directions by the upright annular wall 32 and the annular bottom wall 33, respectively, the rotor 14 rotates about a fixed axis and is pulled downward in a balanced manner, thereby providing the rotor with the best balanced stable rotation.

Figure 4:
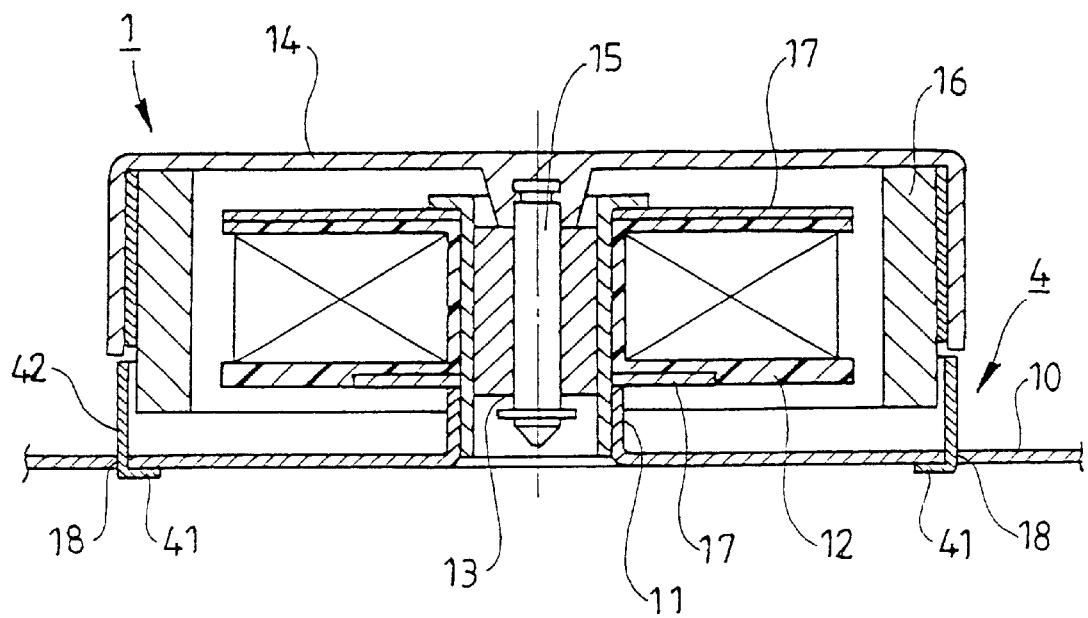
FIG. 4 is a sectional view similar to FIG. 2, illustrating a third embodiment of the motor rotor in accordance with the present invention.

FIG. 4 illustrates a third embodiment of the present invention, wherein the balance ring 4 comprises a plurality of engaging pieces 41 respectively engaged in the positioning holes 18 of the base plate 10. The balance ring 4 includes an upright annular wall 42 located outside the permanent ring magnet 16. When the rotor 14 rotates, since the upright annular wall 42 is located outside the permanent ring magnet 16, the upright annular wall 42 and the permanent ring magnet 16 attract each other. Thus, when the rotor 14 rotates, it is balanced and rotates about a fixed axis without wobbling, thereby providing the rotor with the best balanced stable rotation.

Figure 5:
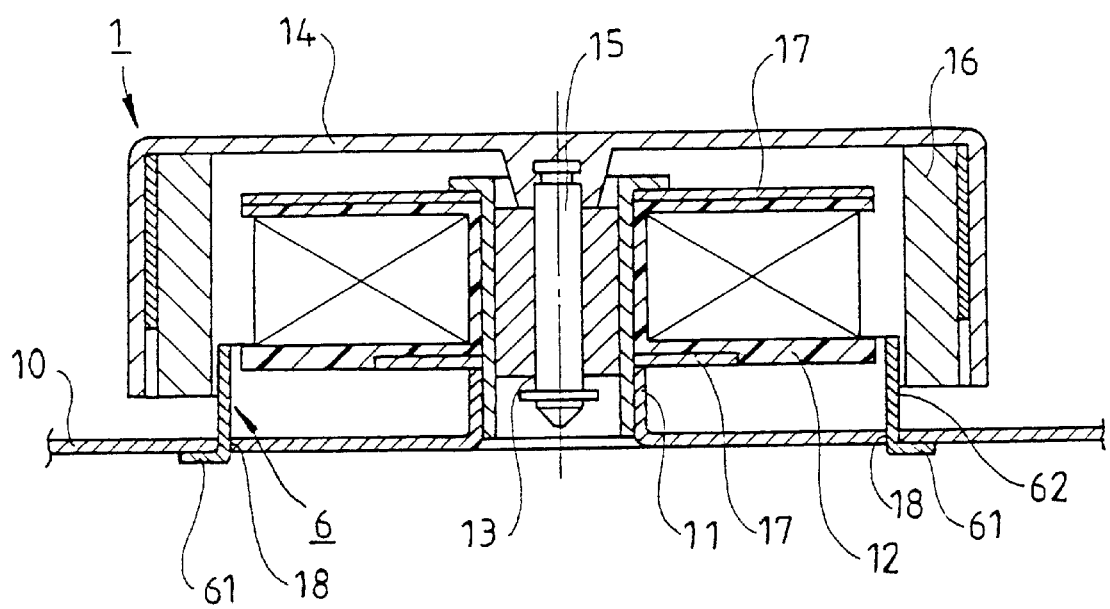
FIG. 5 is a sectional view similar to FIG. 4, illustrating a fourth embodiment of the motor rotor in accordance with the present invention.

FIG. 5 illustrates a fourth embodiment of the present invention, wherein the balance ring 6 comprises a plurality of engaging pieces 61 respectively engaged in the positioning holes 18 of the base plate 10. The balance ring 6 includes an upright annular wall 62 located inside the permanent ring magnet 16. When the rotor 14 rotates, since the upright annular wall 62 is located inside the permanent ring magnet 16, the upright annular wall 62 and the permanent ring magnet 16 attract each other. Thus, when the rotor 14 rotates, it is balanced and rotates about a fixed axis without wobbling, thereby providing the rotor with the best balanced stable rotation.

Figure 6:
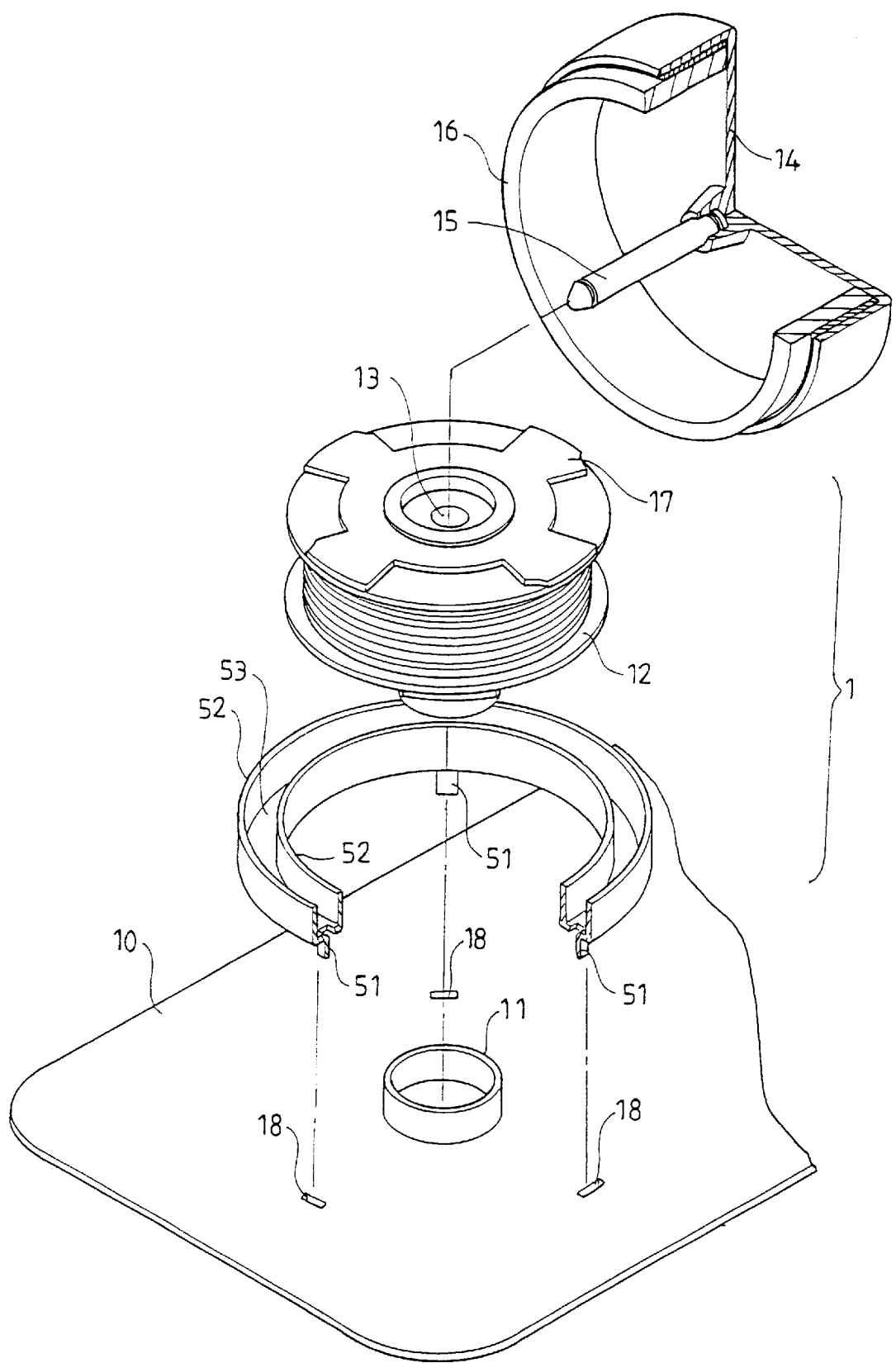
FIG. 6 is an exploded perspective view of a fifth embodiment of the motor in accordance with the present invention.

FIG. 6 illustrates a fifth embodiment of the present invention, wherein the balance ring 5 comprises a plurality of engaging pieces 51 respectively engaged in the positioning holes 18 of the base plate 10. The balance ring 5 includes an inner upright annular wall 52 located inside the permanent ring magnet 16, an outer upright annular wall 52 located outside the permanent ring magnet 16, and an annular bottom wall 53 connecting a lower edge of the inner upright annular wall 52 and a lower edge of the outer upright annular wall 52. The annular bottom wall 52 faces the lower end face of the permanent ring magnet 16. Preferably, the upright annular walls 52 are orthogonal to the annular bottom wall 53.

Figure 7:
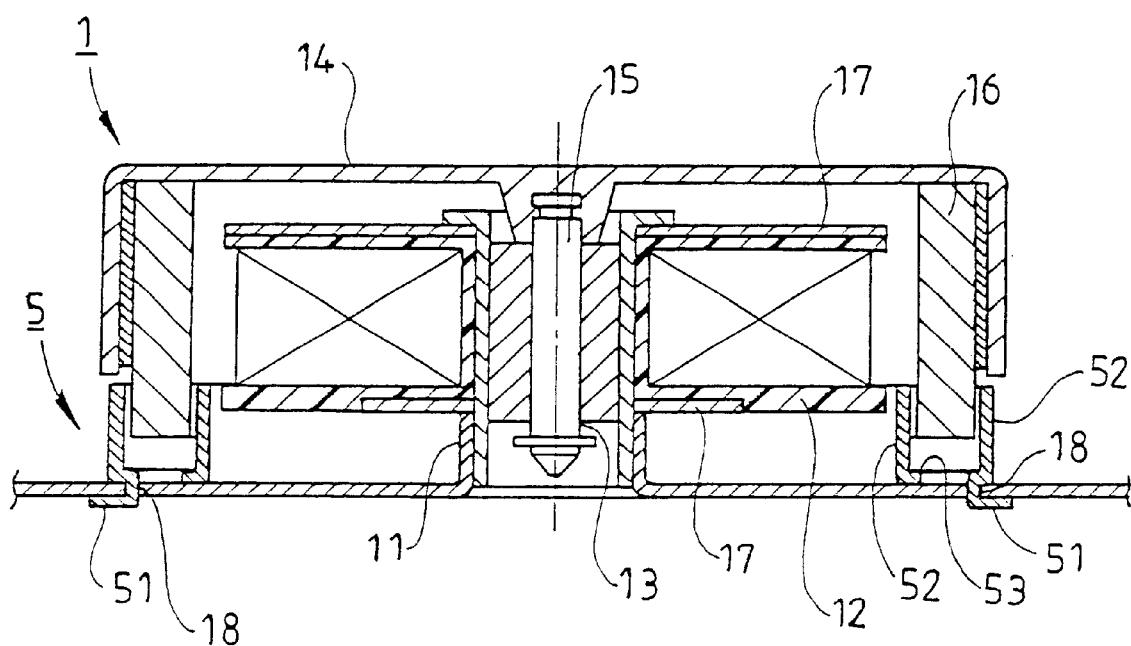
FIG. 7 is a sectional view of the motor in FIG. 6.

Referring to FIG. 7, when the balance ring 5 is fixed to the base plate 10 and the shaft 15 of the rotor 14 is rotatably received in the axle hole 13 of the stator bobbin 12, the permanent ring magnet 16 of the rotor 14 is located between the inner upright annular wall 52 and the outer upright annular wall 52 of the balance ring 5. Thus, when the rotor 14 rotates, the inner upright annular wall 52 and the permanent ring magnet 16 attract each other while the outer upright annular wall 52 and the permanent ring magnet 16 attract each other. In addition, the annular bottom wall 53 and the lower end face of the permanent ring magnet 16 attract each other. As a result, the permanent ring magnet 16 and the balance ring 5 have the maximum magnetic attraction area therebetween. Accordingly, when the rotor 14 rotates, since the inner and outer upright annular walls 52 respectively face an inner periphery and an outer periphery of the permanent ring magnet 16 and since the annular bottom wall 53 and the lower end face of the permanent ring magnet 16 attract each other, the rotor 14 is pulled downward in a balanced manner without wobbling, thereby providing the rotor with the best balanced stable rotation.

According to the above description, it is appreciated that a balance ring with upright annular wall(s) in accordance with the present invention faces the inner periphery (or the outer periphery) and the lower end face of the lower section of the permanent ring magnet, or faces the inner periphery, the outer periphery, and the lower end face of the lower section of the permanent ring magnet, a relatively larger magnetic attraction area between the balance ring and the permanent ring magnet is thus provided. No wobbling occurs and the rotor is pulled downward in a balanced manner during rotation of the rotor, thereby providing the rotor with the best balanced stable rotation.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A motor comprising:

a base plate including an axle seat;

a stator bobbin mounted to the axle seat and including an axle hole;

a rotor including a shaft rotatably received in the axle hole of the stator bobbin, the rotor further including a permanent ring magnet securely attached thereto; and a balance ring mounted to the base plate and including an upright annular wall, the upright annular wall of the balance ring and a lower section of the permanent ring magnet attracting each other.

2. The motor as claimed in claim 1, wherein the base plate including at least one positioning hole, the balance ring including at least one engaging piece that is engaged in said at least one positioning hole.

3. The motor as claimed in claim 1, wherein the rotor includes a skirt having an inner periphery to which the permanent ring magnet is securely attached, the permanent ring magnet extending beyond the skirt.

4. The rotor as claimed in claim 1, wherein the upright annular wall of the balance ring is located inside the permanent ring magnet.

5. The rotor as claimed in claim 1, wherein the balance ring further includes an annular wall extending radially outward therefrom for mutual attraction with a lower end face of the permanent ring magnet.

6. The rotor as claimed in claim 5, wherein the upright annular wall is orthogonal to the annular wall.

7. The rotor as claimed in claim 5, wherein the base plate including at least one positioning hole, the annular wall of the balance ring including at least one engaging piece that is engaged in said at least one positioning hole.

8. The motor as claimed in claim 1, wherein the upright annular wall of the balance ring is located outside the permanent ring magnet.

9. The rotor as claimed in claim 8, wherein the balance ring further includes an annular wall extending radially inward therefrom for mutual attraction with a lower end face of the permanent ring magnet.

10. The rotor as claimed in claim 9, wherein the upright annular wall is orthogonal to the annular wall.

11. The rotor as claimed in claim 9, wherein the base plate including at least one positioning hole, the annular wall of the balance ring including at least one engaging piece that is engaged in said at least one positioning hole.

12. A motor comprising:

a base plate including an axle seat;

a stator bobbin mounted to the axle seat and including an axle hole;

a rotor including a shaft rotatably received in the axle hole of the stator bobbin, the rotor further including a permanent ring magnet; and a balance ring mounted to the base plate and including an inner upright annular wall located inside the permanent ring magnet and an outer upright annular wall located outside the permanent ring magnet.

13. The motor as claimed in claim 12, wherein the base plate including at least one positioning hole, the balance ring including at least one engaging piece that is engaged in said at least one positioning hole.

14. The motor as claimed in claim 12, wherein the balance ring further includes an annular wall connecting a lower end of the inner upright annular wall with a lower end of the outer upright annular wall, the annular wall facing a lower end face of the permanent ring magnet.

15. The motor as claimed in claim 14, wherein the base plate including at least one positioning hole, the annular bottom wall of the balance ring including at least one engaging piece that is engaged in said at least one positioning hole.

* * * * *